April 7, 1953 G. W. ANDREW 2,634,414
PROPORTIONAL CONTROL
Filed Aug. 28, 1945 6 Sheets-Sheet 1

INVENTOR
GORDON W. ANDREW
By William D. Hall.
ATTORNEY

April 7, 1953 G. W. ANDREW 2,634,414
PROPORTIONAL CONTROL
Filed Aug. 28, 1945 6 Sheets-Sheet 4

TIME

INVENTOR
GORDON W. ANDREW
By: William D. Hall
ATTORNEY

April 7, 1953 G. W. ANDREW 2,634,414
PROPORTIONAL CONTROL
Filed Aug. 28, 1945 6 Sheets-Sheet 5

INVENTOR
GORDON W. ANDREW
By: William D. Hall.
ATTORNEY

April 7, 1953 G. W. ANDREW 2,634,414
PROPORTIONAL CONTROL
Filed Aug. 28, 1945 6 Sheets-Sheet 6

INVENTOR
GORDON W. ANDREW
By William D. Hall
ATTORNEY

Patented Apr. 7, 1953

2,634,414

UNITED STATES PATENT OFFICE 2,634,414

PROPORTIONAL CONTROL

Gordon W. Andrew, Dayton, Ohio

Application August 28, 1945, Serial No. 613,196

7 Claims. (Cl. 343—225)

(Granted under Title 35, U. S. Code (1952), sec. 266)

The invention described herein may be manufactured and used by or for the Government for governmental purposes, without the payment to me of any royalty thereon.

This invention relates to remote control systems and more particularly to a proportional remote control system for directing an airborne missile toward its target.

In dropping missiles on targets the original practice was to drop the missiles in free flight, the accuracy of placing the missile upon a target being dependent very largely upon the accuracy with which the operator used his bombsight. In previous radio control systems proportionate control could not be accomplished and no or full rudder only could be applied. The degree of control has been governed by the length of time during which the full rudder was on. In the present device the rudder can be deflected to a desired small or increasingly large angle and the operator knows just what that angle is and the operator can thereby more accurately direct the bomb to the target.

Among the objects of the present invention are to provide an improved proportional control system for directing a dropped missile to its intended target by exercising radio remote control over its course of fall so that the precision of aim is materially enhanced, and to provide an effectually operating device for the stated purpose, which device is of relatively small size and of slight expense as compared with the value of the missile upon which it is mounted and can be easily and rapidly manufactured and assembled.

The above objects are augmented by additional objects that will be apparent to those who are informed in the subject of aerial bombing and radio systems from the following description of an illustrative embodiment of the present invention as set forth in circuit and mechanical form in the accompanying drawings, wherein.

Figure 1:
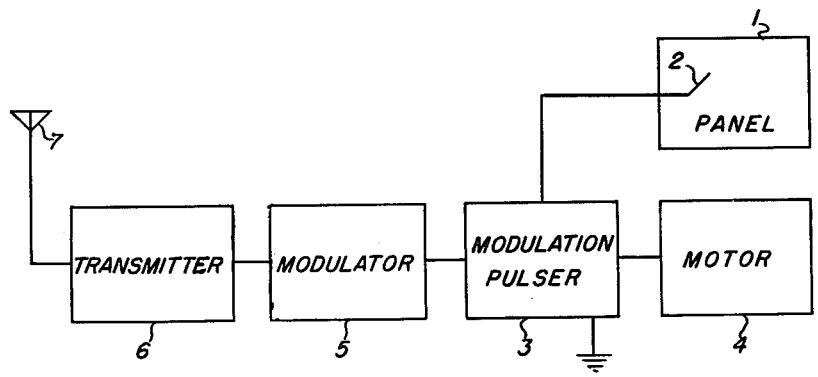
Fig. 1 is a block diagram of the transmitter portion of a preferred missile flight controlling system that embodies a part of the present invention.
Figure 2:
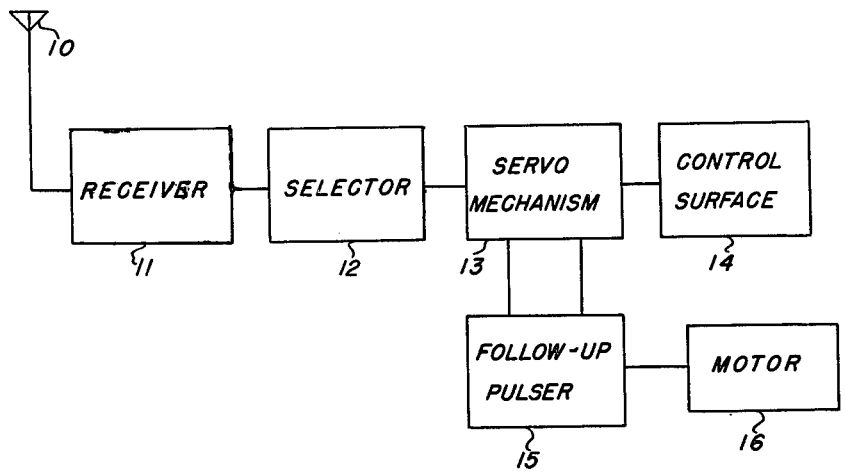
Fig. 2 is a block diagram of the receiver portion of a preferred missile flight controlling system.

The remote control system that is illustrated in the accompanying drawings comprises broadly a control station that is shown in Fig. 1 and a controlled station that is shown in Fig. 2.

The control station comprises a panel 1 that is provided with one or more control sticks 2, or the like, for mechanically adjusting a pulse-regulating contact in a signal commutator or modulation pulser 3 as indicated by a line therebetween. The modulation pulser 3 is driven by a motor 4 and passes a desired pulse thru a modulator 5 and transmitter 6 from which the pulse is emitted upon a carrier from a sending antenna 7.

The controlled station, Fig. 2, comprises a receiving antenna 10 that intercepts the carrier from the transmitting antenna 7 and passes it to a receiver 11. The receiver 11 passes the intercepted carrier to a selector 12, in usual manner, from which a pulse having predetermined characteristics causes a servo mechanism 13 to alter, by mechanical motion preferably, the setting of a control surface 14 to a desired degree in a manner and in a proportion that is governed by a signal commutator or follow-up pulser 15. The follow-up pulser 15 is driven by a motor 16 and is connected electrically with the servo mechanism 13, as indicated by a line therebetween and is linked mechanically to a servo arm, not shown, in the servo mechanism, as indicated by a line therebetween, or to the control surface 14, as preferred.

The control station comprises desired and usual types of panel 1, stick 2, motor 4, modulator 5, transmitter 6 and antenna 7. The modulation pulser 3 is indicated in greater detail in Fig. 3 and comprises a substantially smooth-surfaced cylindrical drum that is driven by the motor 4. The drum has upon its curved surface a plurality of suitable electrical conducting portions 20 and 21 that are preferably aligned with respect to each other axially of the drum and that are continuous at the end portions of the drum. Each of the drum conducting portions 20 and 21 has edges that begin spaced from an end of the drum, on one side thereof, as shown in dotted outline, and that continue upon the opposite side of the drum in edges that taper toward each other away from the ends of the drum, these edges terminating remote from the ends of the drum in spaced insulated relation with respect to each other. A suitable insulation material, such as a plastic 22 or the like fills out the portions of the drum between the two electrical conducting parts 20 and 21 thereof, so that the drum cylinder presents a smooth surface upon which a spring-pressed axially movable contact 23 rides as the drum is rotated.

The movable contact 23 may be moved axially of the drum along the surface on which it rides by the operation of the stick 2 for the purpose of altering the degree of pulse that is fed from the modulation pulser 3 to the modulator 5 during the rotation of the drum.

Two wiping contacts or slip rings 24 and 25 disposed adjacent the axial ends of the drum ride upon the conductors 20 and 21, respectively, in continuous engagement therewith. The slip ring contacts 24 and 25 are connected respectively to the cathodes of a pair of audio oscillators 26 and 27, respectively in the modulator 5.

In the present device the transmitter 6 is modulated by two audio frequencies. A specific modulation frequency depends upon the position of the control stick 2 and hence the position of the variable contact 23 with respect to its middle or neutral position on the drum in the modulation pulser 3. The audio outputs of the oscillators 26 and 27 are amplified and are used to amplitude modulate the transmitter 6. The carrier so modulated is emitted from the antenna 7 of the transmitter 6 and is intercepted by the antenna 10 of the receiver 11 in the missile. The audio frequency from tube 26 is distinct from that from the tube 27 and is adapted for causing the operation of a different set of controls at the missile or at the controlled station.

When the movable contact 23 is disposed axially intermediate the ends of the drum part of the modulation pulser 3, it engages the insulating plastic 22 and no ground is applied to the cathodes of either of the oscillators 26 or 27 of the modulator 5.

When the movable contact 23 is moved toward the right of the drum so that it just engages the innermost portion of the sleeve-like conductor 21 that is disposed on the right hand portion of the drum, the cathode of the right audio control oscillator tube 27 is grounded for a minimum period of time, the carrier is modulated in time to a minimum extent, by the tube 27, and the control surface 14 on the missile is altered in position to a minimum degree. As the movable contact 23 is moved farther toward the right of the drum in the modulation pulser 3, the cathode of the right audio control tube 27 is grounded for increasingly long periods of time with correspondingly longer periods of modulation impressed upon the carrier from the tube 27 and increasingly greater displacement in one direction of the control surface 14 of the missile, thus altering its course of flight, for example, toward the right. The maximum displacement of the control surface 14 in the assumed direction, right azimuth, is arrived at when the movable contact 23 is disposed on the conducting sleeve 21 adjacent the continuously engaged contact 25 on the right hand end of the drum part of the modulation pulser 3, in which position the cathode of the tube 27 is grounded continuously.

Change in the course of the missile to left azimuth is accomplished in a similar manner by the operation of the panel stick 2 so that the movable contact 23 is moved toward the left of the drum in the modulation pulser 3 thereby engaging the electrically conducting sleeve-like contact 20 on the modulation pulser drum for increasingly lengthening the periods of time during which the cathode of the left audio control oscillator tube 26 in the modulator 5 is grounded. The output from the tube 26 is of an audio frequency that differs from that of the tube 27 and the carrier is thereby modulated corresponding to the disposition of the control stick 2 so that the remotely controlled degree of adjustment of the control surface on the missile alters the course of the missile in left azimuth to a degree that is governed by the setting of the movable contact 23 on the conducting contact 20.

Figure 4:
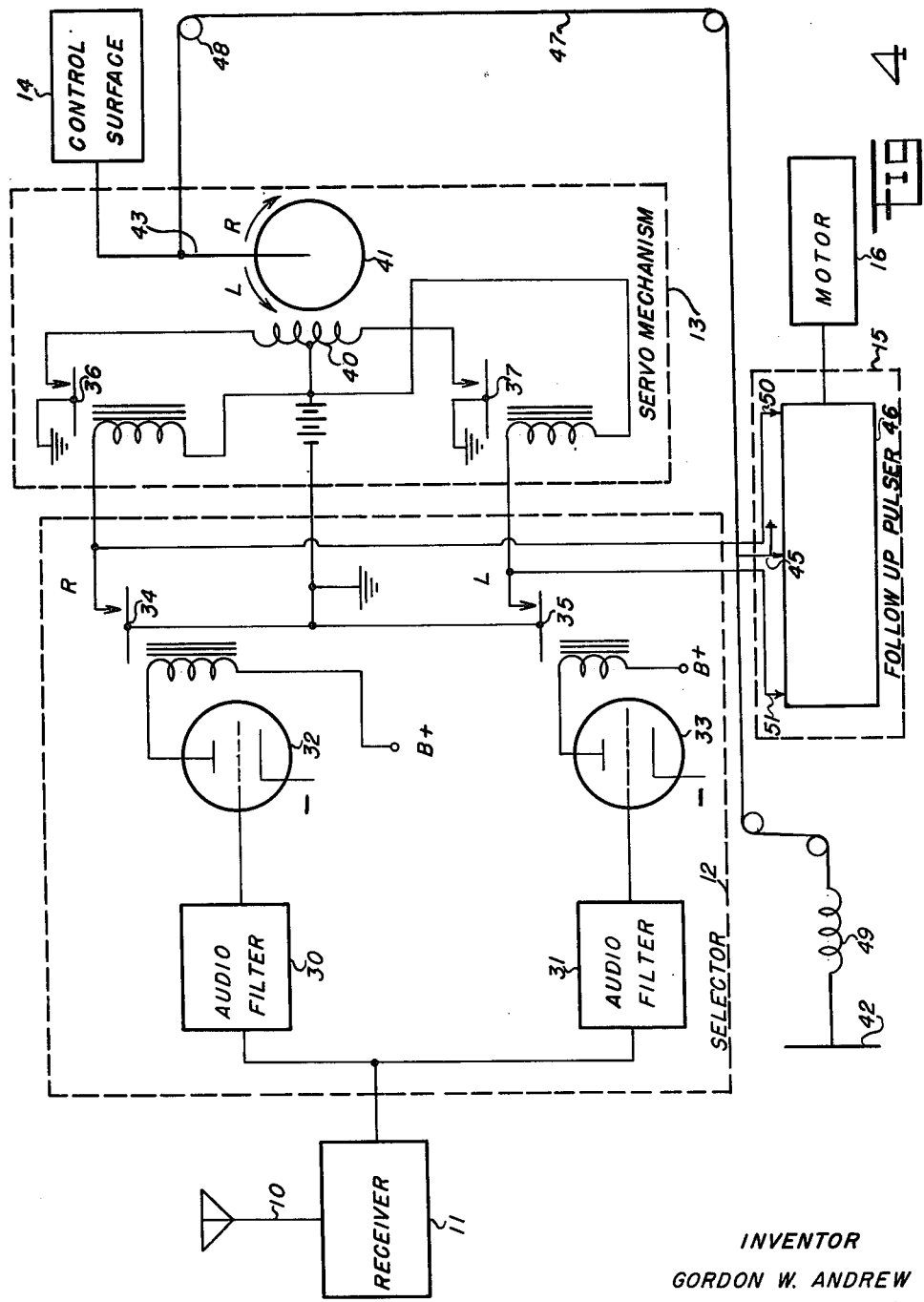
Fig. 4 is a block and partly schematic and diagrammatical presentation of the part of the system that is shown in Fig. 2.

The controlled station shown in Fig. 2 comprises conventional types of antenna 10, receiver 11, selector 12, servo mechanism 13, control surface 14 and motor 16. The selector 12 comprises a desired plurality of audio filter units that operate to pass a corresponding plurality of specific signal frequencies, such as the audio filters 30 and 31, therein, as shown in Fig. 4 of the drawings. The audio filters 30 and 31 feed output to the grids of a corresponding plurality of triodes 32 and 33. The plate currents of the tubes 32 and 33 flow thru the windings of a corresponding plurality of relays 34 and 35, each current respectively being determined by the output of the corresponding audio filter 30 or 31. The plate current is zero, or less than the relay dropout current, in the absence of a signal and is greater than the relay operating current when a signal is passed by the corresponding audio filter. The relays 34 and 35 are preferably of a sensitive type because of the small plate current by which they are operated. These relays 34 and 35 preferably control power relays 36 and 37, respectively, in the servo mechanism 13. The power relays 36 and 37 in turn, control a suitable means, such a servomotor or the like, comprising a split stator winding 40 and a rotor 41, in the servo mechanism 13, for altering the position of a control surface 14, such as a rudder, ailerons, spoilers or the like, thru an arm 43 or the like that is operated by the motor rotor 41.

The follow-up pulser 15 in the missile is comparable in construction and function with the modulation pulser 3 in the control station. The follow-up pulser 15 in the missile is as light and small as is consistent with the obtaining of optimum performance from it in order that it may occupy a minimum of space and be a minimum burden on the airborne missile. The follow-up pulser 15 also is not necessarily as rugged as is the modulation pulser 3 since it is to be used but once and is expended upon the deterioration of the missile upon which it is mounted.

A grounded sliding contact 45 and a drum part 46 of the follow-up pulser 15, are comparable in construction and operation with the sliding contact 23 and the drum in the modulation pulser 3 in that the contact 45 rides on a cylindrical drum 46 of insulating material with a conducting sleeve on each opposite end thereof. The sliding contact 45 is coupled mechanically with the operative arm 43 on the motor rotor 41 in any desired manner, as by a flexible wire, cord or other suitable tension member 47 that passes over friction minimizing members, such as pulleys 48 or the like, that are supported by a mechanical member 42 or other part of the missile, the arrangement being such that when the control contact 23 is moved toward the right the follow-up contact 45 moves toward the left. The sliding contact 45 may, if preferred, be coupled with the control surface 14 to function in the described manner. The cord 47 is maintained in tension in any desired manner with respect to the motor rotor arm 43 so that the sliding contact 45 is maintained in accurate registration with respect to the arm 43, as by the use of a spring 49 or the like that has one end attached to the cord 47 and its other end supported by the missile member 42.

Right and left continuously wiping slip ring contacts 50 and 51 are in engagement with the follow-up pulse drum 46 and are connected with the circuits from the relays 34 and 35 to the power relays 36 and 37, respectively throughout.

In operation, the modulated carrier that is emitted by the control station from the antenna 7 of the transmitter 6, is intercepted at the controlled station by the antenna 10 of the receiver 11 and is passed to the selective audio filters 30 and 31. The audio filters 30 and 31 selectively pass predetermined types of carrier modulation that indicate desired pairs of opposite adjustment of a part of the missile, such as the right-left azimuth control cited herein, as an example. Additional controls on an aircraft or the like are supplied, where desired, such as changes in elevation, in rate of flight, or the like, by supplying additional pairs of audio filter to follow-up pulser circuits and mechanical arrangements as required.

The audio filters 30 and 31 pass signal to the grids of the triodes 32 and 33 that close the relay switches 34 and 35, respectively throughout, during each pulsation in the signal.

If it is assumed that the signal that is received by the antenna 10, and isolated and passed by the audio filter 30, is to turn the missile in azimuth toward the right in an increasingly proportional degree, then the sensitive relay 34 is closed with the application of each pulsation to the tube 32. Each time the relay 34 is closed, the power relay 36 is closed and the intercepted current from the reception of these pulses is applied thereby to the upper portion of the motor split field winding 40 in the servo mechanism 13. The application of this intermittent current to the upper portion of the motor split field winding 40 causes the motor rotor 41 to rotate in steps clockwise, or toward the right. This rotation causes the motor rotor arm 43 to move toward the right to change the setting of the control surface 14, and to also relieve the tension upon cord 47 exercised by spring 49, thus permitting the movable contact 45 attached to cord 47 to be drawn toward the left on the drum 46 in the follow-up pulser 15. This action is effective to energize the relay 37 and thereby energize the lower part of the motor split stator winding 40.

The pulses, as intercepted at the controlled station are of individually equal amplitude and of a time duration that is determined by the setting of the control stick 2 on the panel 1. The continued reception of successive pulsations at the controlled station causes the control surface 14 to gradually assume a predetermined position for that particular setting of the control stick 2 during the time period required for the follow-up pulses through the relay 37 and lower part of the motor split stator winding 40 to build up to a time value or duration that equals the predetermined time value for that setting of the control stick 2. From the instant equal values of the follow-up and control pulses are arrived at, the positioning of the control surface 14 corresponds to the setting of the control stick 2.

This process is repeated for successive settings of the control stick 2 in proportionate steps until the missile is changed in azimuth to the desired degree and is bearing directly upon its target.

Figure 3:
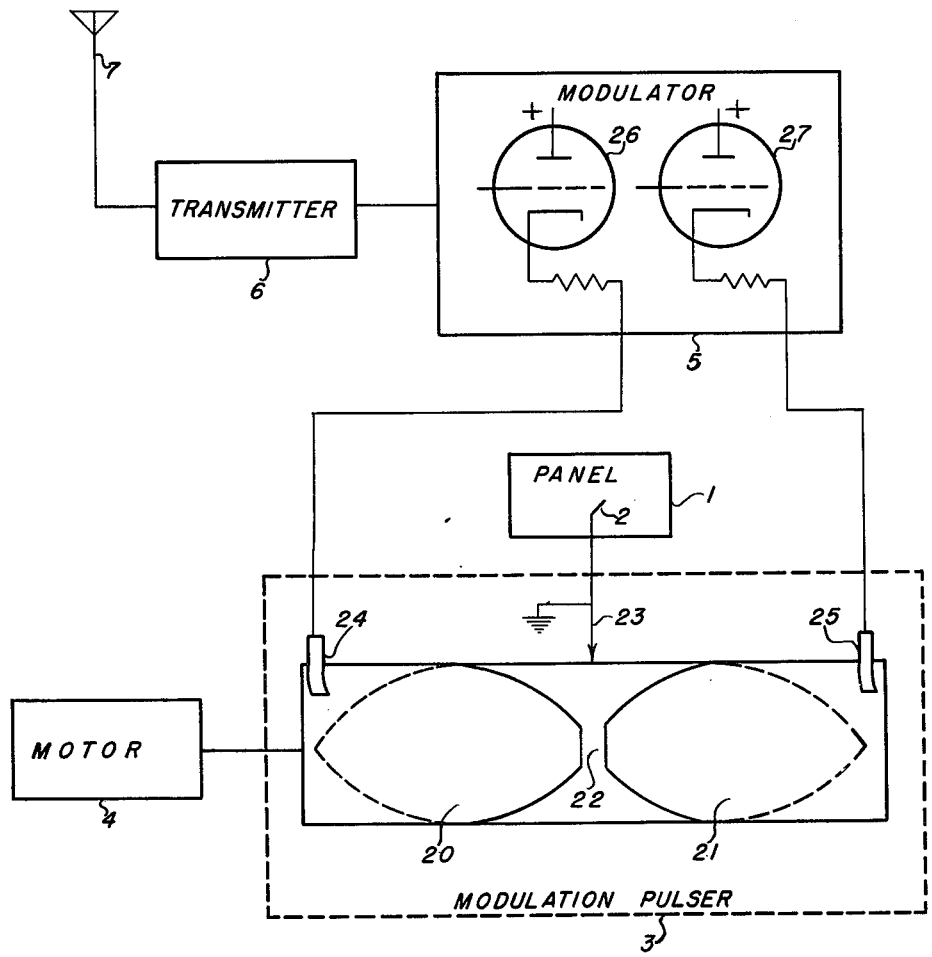
Fig. 3 is a block and partly schematic and diagrammatical presentation of the part of the system that is shown in Fig. 1.

In the event that the control stick 2 at the control station is advanced so that the movable contact 23 on the drum in the modulation pulser 3, Fig. 3, is caused to increasingly approach the right-hand contact 25, the time durations of the positive pulses thru the relay 34 increase accordingly, with the negative pulses thru the relay 35 following proportionately thereafter, as explained above. This increase in the effective right direction field voltage causes further movement of the motor rotor arm 43 so as to turn the rudder or control surface 14 ultimately to its full right-hand position, bringing the movable contact 45 fully toward the fixed contact 51 on the drum of the follow-up pulser 15 with a corresponding neutralization of the torques exerted by the two opposed field windings 40 on the rotor 41.

Upon the arrival of the missile at its desired change in azimuth to the right of its former course, the stick 2 at the control station is caused to be returned to its initial position and the contact 23 that is carried thereby is disposed on the insulating plastic 22 intermediate the spaced ends of the two conducting shields 20 and 21 on the drum of the modulation pulser 3. The disposition of the movable contact 23 on the insulation material 22 removes the ground connection from the oscillator 27 and causes a cessation of the modulating signal on the carrier that is emitted from the antenna 7 and consequently the de-energization of the relay 36 and the upper portion of the split stator field winding 40 in the servo mechanism 13. The contact 45 continues to pulse relay 37 and consequently the lower portion of the split stator field winding 40 until the displacement of the motor rotor arm 43 returns the contact 45 to its insulated position intermediate the two sleeve contacts on drum 46 of the follow-up pulser 15.

In the event that the flight course of the missile is to be altered toward the left, the control stick 2 is moved in the direction that is opposite to that described above for causing the flight of the missile to be altered toward the right. When the control stick 2 is so moved, the sliding contact 23, Fig. 3, is moved toward the continuously engaged contact 24 on the drum of the modulation pulser 3, thereby energizing the oscillator 26 in the modulator 5. The resultant left turn audio modulation is passed by the audio filter 31, Fig. 4, in the selector 12 to the tube 33 to thereby actuate the relays 35 and 37 and energize the lower part of the winding 40, producing counterclockwise rotation of the rotor 41 of the motor in the servo mechanism 13. This movement of the motor rotor 41 carries the arm 43 with it and draws the contact 45 toward the contact 50 engaging the drum 46 of the follow-up pulser 15, energizing the upper part of the motor stator winding 40 to oppose the field of the lower part of the winding 40, until a balanced torque for the rotor 41 is arrived at, as previously described for the right hand turn of the missile.

Figure 5:
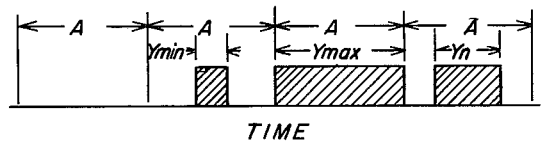
Fig. 5 is a diagram of the pulse envelope of the control signal.
Figure 6:
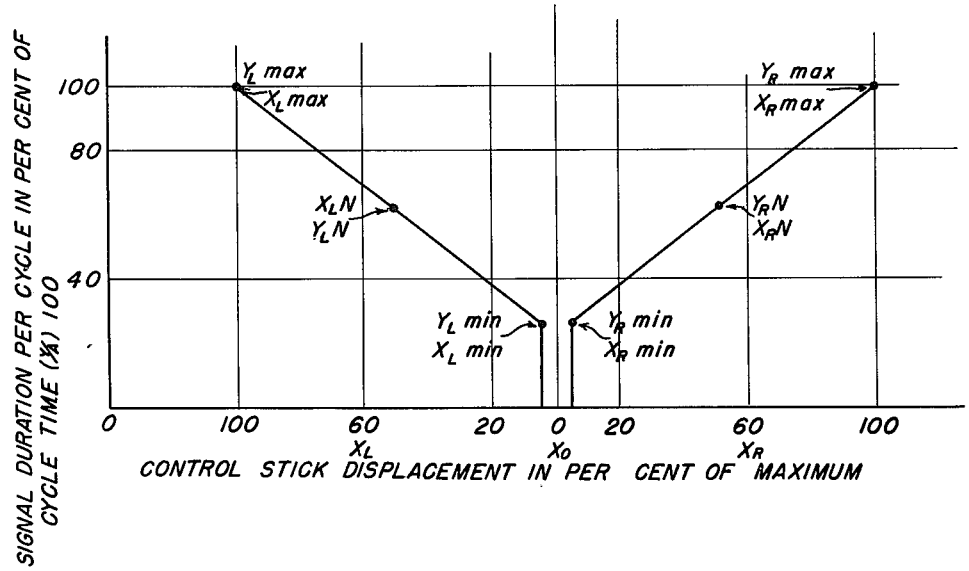
Fig. 6 is a plot of control stick displacement against signal duration.
Figure 7:
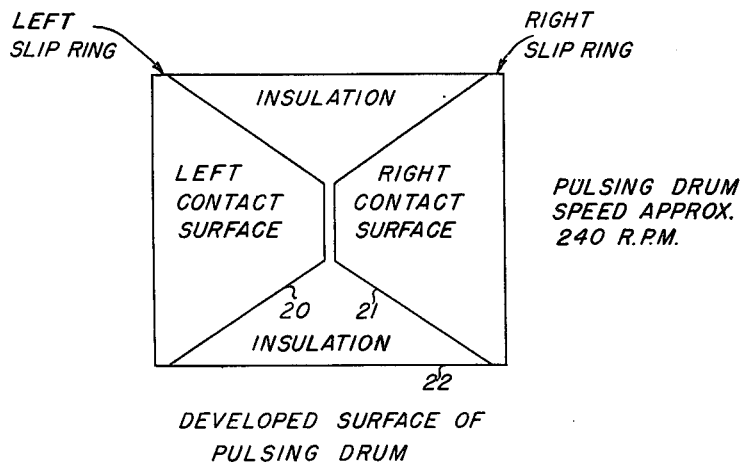
Fig. 7 is a representation of the developed surface of a pulsing drum part of the device.

The modulated control signal is pulsed as indicated, for example, in Figs. 5 and 6 of the accompanying drawings. An illustrative developed surface of the duplicate pulsing drums in the pulsers 3 and 15 is shown in Fig. 7 of the drawings. In the Figs. 5 and 6 of the drawings, the pulse time length is designated as Y seconds, Y max. denoting a maximum value, and Y min. a minimum value of Y, and $Y_N$ meaning any given pulse therebetween. The cycle time for a given angular velocity of the pulsing drums in the pulsers 3 and 15 is determined by the circumferences thereof and is designated as A seconds for a control cycle.

In conformity with these assumptions, $$\frac{Y}{A} \times 100$$

equals the percent of time during which the signal is passed for a given cycle. The ratio $Y/A$ is proportional to the displacement X of the control stick 2 except in the neutral interval between $X_R$ min. and $X_L$ min. wherein R and L designate right and left, respectively. The ratio $$\frac{Y - Y \text{ min.}}{A}$$

is directly proportional to $X - X$ min.

The displacement of the control stick 2 to the right of its neutral position, which may be designated as $X_O$ in Fig. 6, implies modulation of the carrier by the right audio channel frequency emitted by the tube 27. Displacement of the control stick 2 to the left of its neutral position $X_O$ implies modulation by the left audio channel frequency emitted by the tube 26.

Neglecting time delay factors, the contacts of the receiver relays 34 and 35 would follow substantially the pulses shown in Fig. 5. If the duration of the cycle A is made small in comparison with the total time duration of the cycle, designated as T, that is required for full displacement of the controlled surface 14 when the circuit of the servo mechanism 13 is continuously energized, then for any given control pulse $Y_{RN} < A < T$ corresponding to a control stick 2 displacement $X_{RN}$, full displacement of the controlled surface 14 will be reached after a period of time that corresponds to KA cycles, where $Y_N$ is any given pulse between maximum and minimum, as previously stated, and where K is any number such that K times the pulse duration $Y_{RN}$ equals the time T.

In the absence of a follow-up system, therefore, a given control stick displacement $X_{RN} < X_R$ max. will eventually produce the maximum displacement of the control surface 14. The servo-motor rotor 41, however, will come to rest at a displacement $X_{RN}$ for a control stick displacement $X_{RN}$ if, as the control surface 14 moves toward $X_{RN}$ the follow-up system applies a counter-acting control to the servo-motor rotor 41 such that, for any position of the control surface $X_{RM}$ the follow-up signal would correspond to a control pulse that is equal to $Y_{LM}$.

When the control surface 14, therefore, reaches the displacement $X_{RN}$, the counteracting follow-up signal becomes equal to $Y_{LN}$ which is equal and opposite to the control signal $Y_{RN}$, and hence the controlled surface 14 tends to come to rest at $X_{RN}$. In any practical system, the phasing of the follow-up signals with respect to the control signals is random and consequently the controlled surface 14 may tend to hunt about the desired displacement with the rate and excursion dependent upon cycle time A and the rate of travel of the servo mechanism 13.

As an example, if any given intermediate pulse $Y_N$ is equal to one-half of A, then the maximum hunt excursion will be equal to A/2 times the rate of travel of the servo mechanism 13 and will occur when the follow-up signal leads or lags the control signal by $Y_N$ seconds, and zero hunt will occur when the control and follow-up signals are exactly in phase.

For values of pulse length Y that are greater than A/2, the maximum hunt excursion equals A/2 times the rate of travel of the servo mechanism 13. For values of Y that are less than A/2, the hunt excursion equals Y times the rate of travel of the servo. The hunt excursion, therefore, can be made small by making the control cycle duration A small. In any given system, however, the minimum value of A is limited by the time delay factors of the relays, filters, servo mechanism, etc. of the complete system.

It has been found experimentally that, using substantially identical modulation and follow-up pulsers, the minimum pulse length or Y seconds to which the radio link and the servo mechanism 13 will respond was found to be approximately one-twentieth of one second. The accuracy of control was found to increase as the ratio of Y max. to Y min. or $A/Y$ seconds increased. It also has been found that the cycle time A must be small to prevent large hunt excursions. The cycle time A of the modulation pulser 3 need not be closely matched to the cycle time of the follow-up pulser 15, but both cycle durations must not be permitted to vary to the extent that Y seconds becomes too short for the system to respond or that the maximum response delay, or $A - Y$ seconds, becomes excessively large.

If the control stick 2 is displaced to $X_R$ min. the pulse $Y_R$ min. may occur instantaneously, or it may start as late as $A - Y_R$ min. seconds after the control stick 2 has been displaced. If A is equal to one-fourth second, and Y min. is equal to one-fifteenth second, the maximum time delay between the displacement of the stick 2 and the start of the pulse time transmission of Y min. seconds will be 0.193 second.

The system that is presented herein may be adapted for exercising control over a plurality of functions, if desired, on the missile, such as pitch or the like, in addition to the right-left control that has been described hereabove. The shroud on a missile normally has two sets of controls, right-and-left and pitch, on the shroud thereof. The term pitch, used in this connection, is intended to denote the forward and backward motion of a bomb, with respect to an aircraft from which it is launched, that is regulated by the up or down adjustment of the pair of pitch regulating control surfaces on the bomb shroud.

The present invention may be adapted to control two functions, such as both the right and left pair of controls mentioned heretofore and the up and down adjustment of the pair of pitch controls on the bomb. In this adaptation two additional audio modulation channels, an additional control pulse drum and an additional follow-up pulse drum may be added to the system, or additional contacts may be applied to the pulse drums in the modulation pulser 3 and in the follow-up pulser 15 to provide pick-off systems, such as those illustrated diagrammatically in Figs. 8 and 9 of the accompanying drawings.

Figure 8:
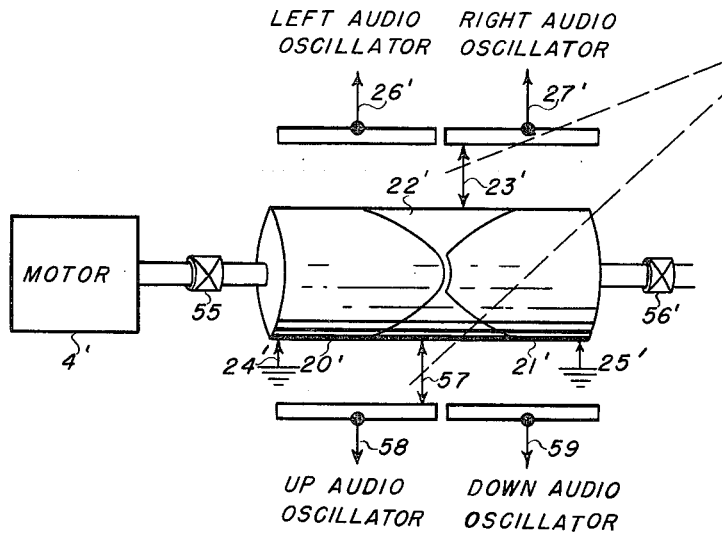
Fig. 8 is a representation of the azimuth and altitude control pulsing drum and associated equipment under the control of a single control stick in the transmitting part of the device.

The modulation pulser that is shown in Fig. 8 and that is disposed at the control station, is analogous to the modulation pulser 3, and its comparable parts bear the same numerals primed to facilitate the association therebetween. The pulsing drum is preferably mounted between flexible couplings 55 and 56 on its shaft and is driven by the motor 4'. The right-left contact 23' engages the drum and conducts pulses to the "left" audio oscillator 26' or to the "right" audio oscillator 27' depending upon its disposition on the pulsing drum. Another contact 57 engages the drum along a slide that preferably is spaced circumferentially of the drum in relation to the contact 23' and conducts pulses to an "up" audio oscillator 58 and to a "down" audio oscillator 59 depending upon the positioning of the contact 57 longitudinally of the pulsing drum. The contacts 23' and 57 may be under the ganged control of a single control stick 2', as shown, or may be operated individually, as preferred.

Figure 9:
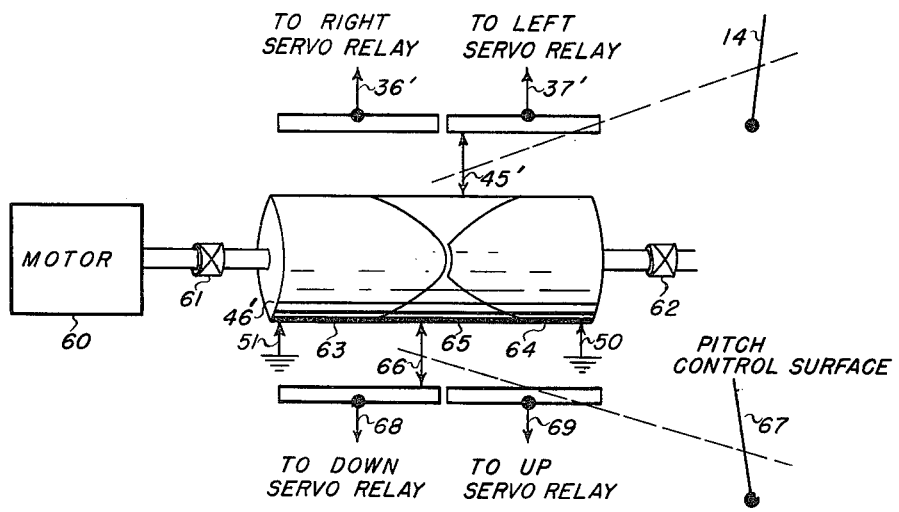
Fig. 9 is a representation of the control pulsing drum and associated equipment in the receiver or the controlled part of the device.

A corresponding adaptation for the follow-up pulser is shown in Fig. 9 of the drawings. In this adaptation the follow-up drum 46' is driven by the motor 60 thru a flexible coupling 61 and its opposite end is journalled in any desired manner thru another flexible coupling 62. The follow-up pulsing drum 46' is provided with electrically conducting tapered sleeves 63 and 64 with an insulating material 65 interposed therebetween. The right-left contact 45' that adjustably rides on the drum 46' is connected to right-left servo relays 36' and 37', depending upon its disposition axially of the drum 46', as in the assembly that is shown in Fig. 4 of the drawings. The adjustment of the contact 45' is accomplished by the movement of the control surface 14'. Another contact 66 which rides on the drum 46' is shifted longitudinally of the drum 46' by the disposition of a pitch control surface 67 in response to pulsing signal from the contact 57 in Fig. 8, and applies pulsations to a "down" servo relay 68 and to an "up" servo relay 69 in another servomechanism, not shown, but that functions substantially as the servomechanism shown in Fig. 4 functions. Thru the use of the modifications that are shown in Figs. 8 and 9 of the drawings, the course of a falling or gliding missile may be changed toward the right or left and may be directed in pitch, either forward or backward with respect to its free flight course.

It is to be understood that the remote control system that is presented and explained herein has been submitted for the purposes of illustrating and describing an operative embodiment of the present invention and that modifications, substitutions and changes may be made therein that result in similarly operating systems without departing from the scope of the present invention.

What is claimed is:

1. In combination, a control station comprising: a plurality of normally inoperative controlling means for respectively controlling the transmission of a plurality of distinctively modulated pulses of electrical energy having variable pulse widths; pulser means for selectively operating for variable intervals of time at least one of said controlling means, said pulser means including, a rotating surface a portion of which is electrically conductive and coupled to said controlling means, and means contacting said surface and adapted to operate at least one of said controlling means by completing its circuit through the conducting portion of said surface; and means for selecting the period of time and which of said controlling means shall be operated by said pulser means; and a controlled station comprising: an equal plurality of other controlling means respectively adapted to be activated upon reception of said distinctively modulated pulses; controlled means receptive of the outputs of said other controlling means and adapted to be variably positioned thereby; and follow-up pulser means for maintaining said controlled means at any position, including a rotating surface, a portion of which is electrically conductive, and coupled to said controlled means, and means contacting said rotating surface for activating at least one of said other controlling means for the same period of time as said pulse widths and connected to said controlled means for movement thereby.

2. In combination, a control station comprising: transmitter means; a plurality of modulator means for distinctively modulating said transmitter means, said modulator means being respectively adapted to be activated in response to a potential applied thereto; an electrical pulser including, a rotating surface consisting of a pair of tapered electrical conducting portions converging towards one another from opposite ends and terminating in spaced relation near the center, the remainder of said surface being electrically nonconductive, and means in contact with said surface for applying said potential through said conducting portions of said surface to said modulator means; and means coupled to said pulser for selecting the modulator means to be thus activated and for determining the time duration of the activation, whereby said transmitter means will transmit variable width distinctively modulated pulses of energy; and a controlled station having controlled means adapted to be variably positioned, comprising: receiver means for receiving said pulses sent out by said transmitter means; an equal plurality of controlling means receptive of the output from said receiver means, each adapted to be activated either by said output or by having a potential applied thereto and each adapted to pass a different one of said modulator outputs to said controlled means for varying its position; and an electrical follow-up pulser including, a rotating surface consisting of a pair of tapered electrically conducting portions converging towards one another from opposite ends and terminating in spaced relation near the center, the remainder of said surface being non-conducting, and means contacting said surface for activating at least one of said controlling means for the same period of time as said pulses and connected to said controlled means for movement thereby, said controlling means being arranged in the same order relative to said second-named surface as said modulator means are with respect to said first-named surface, said second-named means for applying said potential being moved by said controlled means in a direction opposite to the movement of said selecting means, whereby said controlled means will remain stationary at its new position.

3. A station having controlled means adapted to be variably positioned, comprising: receiver means adapted to receive distinctively modulated variable width pulses sent out by a control station; a plurality of controlling means receptive of the output from said receiver means, each adapted to be activated either by said output or by having a potential applied thereto and each adapted to pass a differently modulated pulse to said controlled means for varying its position; and an electrical follow-up pulser including, a rotating surface consisting of a pair of tapered electrical conducting portions converging towards one another from opposite ends and terminating in spaced relation near the center, the remainder of said surface being non-conducting, and means in contact with said drum surface and connected to said controlled means, for applying said potential through the conducting portions of said surface to at least one of said controlling means, said means for applying said potential being moved by said controlled means in a direction such as to activate at least one of said controlling means for a period of time equal to said pulse widths and which will oppose movement of said controlled means, whereby said controlled means will remain stationary at its new position.

4. The station of claim 3, wherein said surface comprises the surface of a rotating drum, and further including at least two means respectively in contact with the electrically conductive opposite ends of said surface and each connected to a respective one of said modulator means, said means for applying said potential comprising brush means coupled to said selecting means and connected to said potential.

5. The station of claim 3, wherein said surface comprises the surface of a rotating drum, and further including at least two means respectively in contact with the electrically conductive opposite ends of said surface and connected to said potential, said means for applying said potential comprising at least two brush means coupled to said selecting means and each adapted to be selectively coupled to a respective one of said modulator means.

6. A control station comprising: transmitter means; a plurality of modulator means for distinctively modulating said transmitter means, said modulator means being respectively adapted to be activated in response to a potential applied thereto; an electrical pulser including, a rotating drum having a surface consisting of a pair of tapered electrically conducting portions converging towards one another from opposite ends of said drum and terminating in spaced relation near the center, the remainder of said surface being electrically non-conductive, at least two means respectively in contact with the electrically conductive opposite ends of said drum surface and each connected to a respective one of said modulator means, and brush means connected to said potential for applying said potential through said conducting portions of said surface and through one of said contact means to one of said modulator means; and means coupled to said brush means for selecting the modulator means to be activated and for determining the time duration of the activation, whereby said transmitter means will transmit variable width distinctively modulated pulses of energy.

7. A control station comprising: transmitter means; a plurality of modulator means for distinctively modulating said transmitter means, said modulator means being respectively adapted to be activated in response to a potential applied thereto; an electrical pulser including, a rotating drum having a surface consisting of a pair of tapered electrically conducting portions converging towards one another from opposite ends of said drum and terminating in spaced relation near the center, the remainder of said surface being electrically non-conductive, at least two means respectively in contact with the electrically conductive opposite ends of said drum surface and connected to said potential, and at least two brush means in contact with said surface and each adapted to be respectively coupled to one of said modulator means; and means coupled to said brush means for selecting the modulator means to be activated through said brush and contact means and for determining the time duration of the activation, whereby said transmitter means will transmit variable width distinctively modulated pulses of energy.

GORDON W. ANDREW.

REFERENCES CITED

The following references are of record in the file of this patent:

UNITED STATES PATENTS

| Number | Name | Date |
| --- | --- | --- |
| 1,597,416 | Mirick | Aug. 24, 1926 |
| 1,793,989 | Barr | Feb. 24, 1931 |
| 2,165,800 | Koch | July 11, 1939 |
| 2,171,150 | Shelby | Aug. 29, 1939 |
| 2,176,469 | Moueix | Oct. 17, 1939 |
| 2,256,336 | Beatty | Sept. 16, 1941 |
| 2,371,415 | Tolson | Mar. 13, 1945 |
| 2,397,088 | Clay | Mar. 26, 1946 |
| 2,397,477 | Kellogg | Apr. 2, 1946 |
| 2,454,773 | Chatterjea et al. | Nov. 30, 1948 |
| 2,580,453 | Murray et al. | Jan. 1, 1952 |